March 25, 1952 — D. L. MORDELL ET AL — 2,590,340
SPEED RESPONSIVE DEVICE WITH FLUID PRESSURE MODIFIER
Filed April 30, 1948
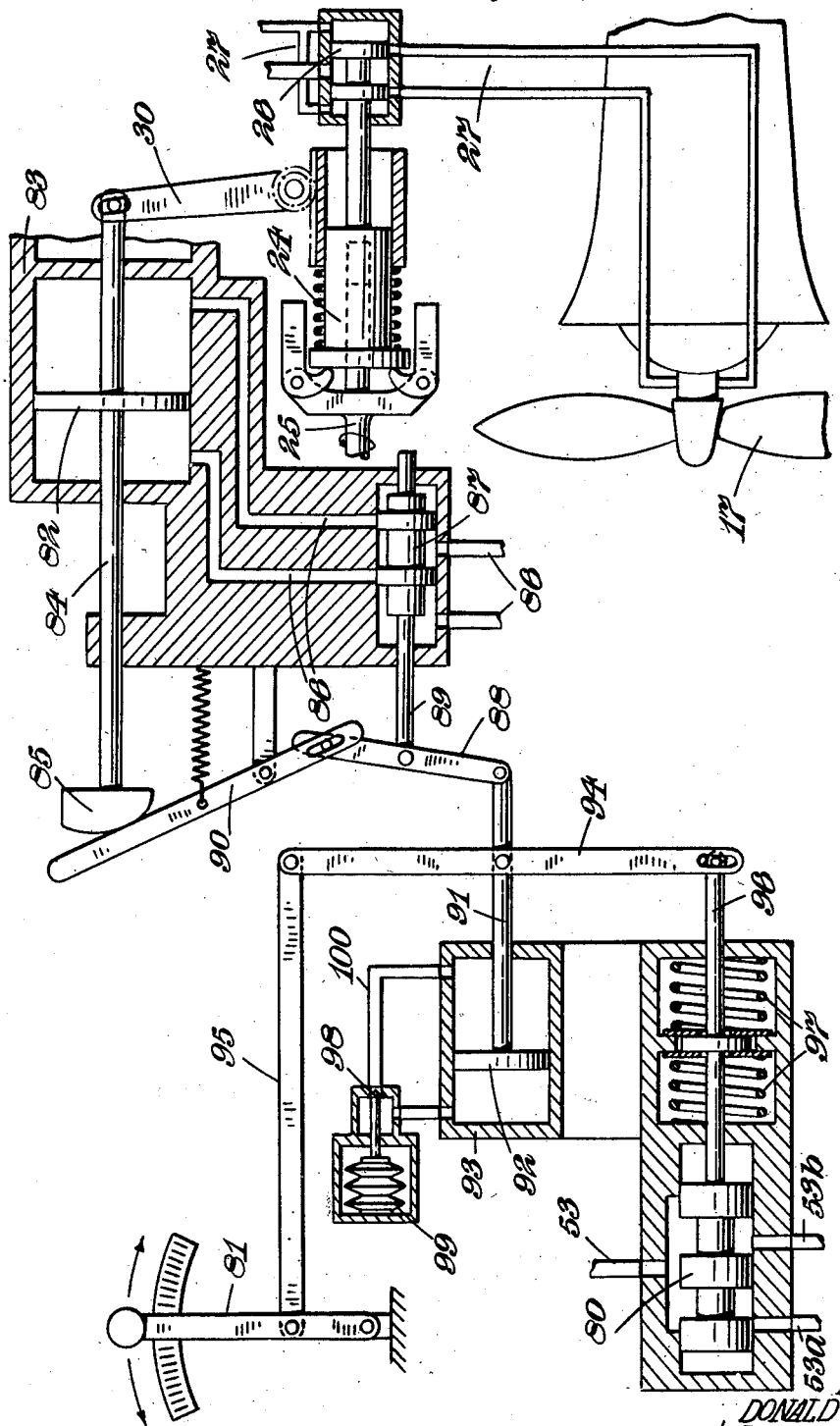
INVENTORS
DONALD L. MORDELL
& JOHN B. HOLLIDAY
BY Wilkinson & Mawhinney
ATTORNEYS Patented Mar. 25, 1952

2,590,340

UNITED STATES PATENT OFFICE 2,590,340

SPEED RESPONSIVE DEVICE WITH FLUID PRESSURE MODIFIER

Donald Louis Mordell, Montreal, Quebec, Canada, and John Bertram Holliday, Derby, England, assignors to Rolls-Royce Limited, Derby, England, a British company Application April 30, 1948, Serial No. 24,377
In Great Britain May 13, 1947

16 Claims. (Cl. 264—7)

1

This invention relates to control systems for aircraft power-plant installations of the kind comprising a gas-turbine engine driving a variable-pitch airscrew (within which term is included a ducted fan), the rotational speed of which is determined by governor means, such as a constant speed unit, including pitch changing means operative to vary the pitch of the airscrew to maintain a pre-selected rotational speed.

The governing means may comprise a centrifugal or equivalent governor having a variable datum which can set to preselect a desired rotational speed of the airscrew, the governor being operative through a suitable servo system to vary the airscrew pitch in accordance with the preselected setting of the variable datum.

It is an object of this invention to provide an improved control system for power-plant installations of the type referred to whereby handling of the power-plant is facilitated.

According to the present invention, a control system for an aircraft power-plant installation of the kind referred to includes a governor means having a variable datum, said governor means being operative to control the airscrew pitch to maintain a preselected engine speed, a manually operable member to select the engine speed to be maintained, and a servo-mechanism interconnecting the manually operable member and the variable datum of the governor means in such manner that, on selection of the desired engine speed the rate of response of the governor means is varied in accordance with the ambient pressure.

For example, the servo means operatively connecting the manually operated member and the governing means may comprise a dash-pot device the rate of travel of which is controlled as a function of the ambient pressure so that on selecting a desired rotational speed, the rate of response of the servo mechanism and therefore of the governing means is a function of the ambient pressure. In this manner it is unnecessary for the operator when changing the setting of the manually operated selector member to relate the rate of change of position of the manual selector means to the ambient pressure.

According to a further aspect of the invention a control system for an aircraft power-plant installation of the kind referred to comprises a manually operable member for selecting airscrew rotational speed datum, engine fuel control means controlled by said manually operable member, and means for so varying the rate of response of change of pitch of the airscrew in relation to the fuel delivered by such engine fuel control means

2 that the airscrew torque is progressively increased or decreased with the corresponding changes of engine speed.

Preferably the rate of change of the airscrew pitch upon selection of a change of datum speed is varied in accordance with the variations of ambient pressure, and the fuel delivery to the engine is determined in accordance with such ambient pressure and as a function of the instantaneous running speed of the engine.

It may be arranged that the fuel supply during acceleration or deceleration of the engine is such that the actual airscrew torque at any instantaneous speed corresponds to the torque delivered under steady running conditions, excess fuel being provided appropriate for effecting acceleration of the engine.

The invention may thus avoid the necessity for skilled handling of the engine controlling means by providing that the required airscrew response and engine fuel system control is substantially automatic.

The invention may conveniently be used in combination with the fuel control systems as described in our co-pending patent application Serial No. 24,378, filed April 30, 1948, according to which the delivery of fuel to the engine is predetermined in accordance with the instantaneous speed of the engine, as a desired function of that speed.

One embodiment of control sytem of this invention will now be described by way of example, reference being made to the accompanying diagrammatic drawing which illustrates the control of the engine-driven airscrew in accordance with the invention.

This invention provides means for controlling the rate of change of thrust of the airscrew and one such control arrangement is illustrated in the drawing. The control comprises a servo-mechanism connecting the pilot's control lever 81, the member 30 for setting the datum of the airscrew pitch governor 24, a resilient means 97, in such manner that the rate of pitch change on selecting a desired engine speed and thus the rate of change of airscrew thrust, is varied for varying ambient pressures.

The lever 81 is moved to the right to increase the engine speed and to the left to decrease the engine speed.

The member 30 is set as to its position by an hydraulic setting control which includes a piston 82 working in a cylinder 83 and having a double-ended piston rod 84 one end of which is connected to the member 30 and the other end of which carries a cam member 85. The supply of pressure fluid to the cylinder 83 through pipelines 86 is controlled by a valve 87 and the valve 87 is displaced under control of the servo-mechanism.

The servo-mechanism comprises a link 88 pivoted at a point intermediate its length to the stem 89 of the valve member 87, and at its ends respectively to a rocking lever 90 co-operating with cam 85 and to the piston rod 91 of the piston 92 of a dash-pot device 93.

The piston rod 91 has pivoted on it a lever 94 one end of which is connected by a link 95 to the control lever 81 and the other end of which is pivoted to the stem 96 of the resilient means 97.

The dash-pot movement is controlled by a by-pass 100 the rate of flow of fluid through which is restricted by a needle valve 98 under control of a barometric capsule 99. In this way the rate of movement of the dash-pot is controlled to vary with variations in ambient pressure occurring, for instance due to changes of altitude, so that the rate of pitch change will also vary with changes of ambient pressure.

The operation of the arrangement is as follows:

For steady running conditions, the valve 89 occupies the position illustrated, so that the member 30, occupies a position dependent on the setting of lever 81.

If now the throttle or power lever 81 is suddenly opened, the dash-pot piston 92 will act initially as an abutment and the lever 94 will rock to displace the stem 96. The springs 97 now load the valve towards its central position and in returning to the central position lever 94 is rocked on the link 95 and the dash-pot piston 92 is displaced at a rate under control of the needle valve 98 dependent on the ambient atmospheric pressure. The displacement of the dash-pot piston 92 rocks lever 88 and opens the cylinder 83 to the pressure fluid supply and thus causes the piston 82 to move to increase the loading of the governor 24. Movement of the piston 82 causes a displacement of cam 85 and thus rocking of the lever 90 in such manner as to tend to return the valve 87 to its central position. The lever 90 thus acts as a follow-up mechanism and the piston 82 will be locked in a position dependent on the setting of lever 81.

The shape of the cam 85 determines the ratio of the linear speed of movement of the piston 82 and dash-pot piston 92, so that by suitably shaping the cam 85 the rate of movement of the piston 82 can be correlated with that of the dash-pot piston 92 so that the rate of pitch change of the airscrew is dependent on the actual rotational speed of the engine.

A similar operation takes place when the engine is decelerated, the piston 82 being displaced to unload the governor 24.

The arrangement just described can clearly be employed for controlling an electrically-operated constant speed governor device.

We claim:

1. A control-system for an airscrew pitch changing mechanism of the type controlled by a variable datum governor means, which comprises an operator-controlled lever operatively connected to said governor means to alter the datum thereof; damping means interposed between the operator-controlled lever and said governor means, a first mechanical linkage connecting said operator-controlled lever with said damping means, a second mechanical linkage connecting said damping means with said governor means, and the arrangement being such that the rate of change of said datum is controlled independently of the rate at which the operator-controlled lever may be moved; pressure-sensitive means subjected to ambient pressure and operable to vary, in accordance with ambient pressure the rate at which the damping means controls a change of datum of said governor means.

2. A control-system according to claim 1 wherein said first mechanical linkage comprises resilient means such that, by selecting any one datum setting by said operator-controlled lever, the resilient means is compressed and following such selection, the resilient means will operate on the second mechanical linkage to alter the datum of said governor means in accordance with a rate controlled by said damping means.

3. A control-system for an airscrew variable pitch mechanism of the type controlled by variable datum governor means, which comprises an operator-controlled lever operatively connected to said governor means to alter the datum thereof; a dash-pot having a variable by-pass, interposed between the operator-controlled lever and said governor means, a first mechanical linkage connecting said operator-controlled lever with said dash-pot, a second mechanical linkage connecting said dash-pot with said governor means, the arrangement being such that the rate of change of datum of said governor means is controlled, independently of the rate at which the operator-controlled lever may be moved; and pressure sensitive means subjected to ambient pressure and operable to vary, in accordance with ambient pressure, the rate at which the dash-pot controls a change of datum of said governor means.

4. A control-system as claimed in claim 3 comprising a needle valve operable to vary said by-pass and wherein said pressure-sensitive means comprises a barometric capsule subjected to ambient pressure and connected to said needle valve, whereby the rate at which the dash-pot controls a change of datum of said governor means is varied according to ambient pressure.

5. A control-system for an airscrew variable pitch mechanism of the type controlled by variable datum governor means, which comprises an operator-controlled lever operatively connected to said governor means to alter the datum thereof; damping means interposed between the operator-controlled lever and said governor means, a first mechanical linkage connecting said operator-controlled lever to said damping means, a second mechanical linkage connecting said damping means to said governor means, the arrangement being such that the rate of change of datum of said governor means is controlled, independently of the rate at which the operators control lever may be moved; pressure sensitive means subjected to ambient pressure and operable to vary, in accordance with ambient pressure, the rate at which the damping means controls a change of datum of said governor means; cam means connected by said second mechanical linkage with said governor means and controlled thereby in accordance with the instantaneous datum setting of said governor means, and operable to vary, in accordance with said instantaneous datum setting, the rate at which the damping means controls a change of datum of said governor means.

6. A control-system according to claim 5 wherein said first mechanical linkage comprises resilient means such that by selecting any one datum setting by said operator-controlled lever, the resilient means is compressed and following such selection, the resilient means will operate on the second mechanical linkage to alter the datum of said governor means in accordance with the rate controlled by said damping means.

7. A control-system for an airscrew pitch changing mechanism of the type controlled by variable datum governor means, which comprises an operator-controlled lever operatively connected to the said governor means to alter the datum thereof; a dash-pot having a variable by-pass, interposed between the operator-controlled lever and said governor means, a first mechanical linkage connecting said operator-controlled lever to said dash-pot, a second mechanical linkage connecting said dash-pot with said governor means, the arrangement being such that the rate of change of datum of said governor means is controlled, independently of the rate at which the operator-controlled lever may be moved; pressure sensitive means subjected to ambient pressure and operable to vary, in accordance with ambient pressure, the rate at which the dash-pot controls a change of datum of said governor means; cam means connected by said second mechanical linkage with said governor means and controlled thereby in accordance with the instantaneous datum setting of said governor means, and operable to vary, in accordance with said instantaneous datum setting of said governor means, the rate at which the dash-pot controls a change of datum setting of said governor means.

8. A control-system as claimed in claim 7 comprising a needle valve operable to vary said by-pass and wherein said pressure sensitive means comprises a barometric capsule subjected to ambient pressure and connected to said needle valve, whereby the rate at which the dash-pot controls the change of datum of said governor means is varied according to ambient pressure.

9. A control-system for an airscrew pitch-controlling mechanism of the type including a variable datum governing means having a datum-setting member, which system comprises a variable speed motor connected to adjust said datum-setting member; an operator-controlled member operative to initiate movement of said motor and to determine the amount of such movement; speed control means to determine the speed of operation of said motor; and pressure-sensitive means subjected to ambient pressure and operatively connected to adjust said speed-control means.

10. A control-system for an airscrew pitch-controlling mechanism of the type including a variable datum governing means having a datum-setting member; which system comprises an operator-controlled member, movable over a range of positions; a follow-up device having a control member and a follow-up member whereof said control member is connected to follow said operator-controlled member and said follow-up member is connected to adjust said datum-setting member; speed-controlling means to control the speed at which said control member follows said operator-controlled member; and pressure-sensitive means subjected to ambient pressure and operatively connected to adjust said speed-controlling means.

11. A control-system for an airscrew pitch controlling mechanism of the type including a variable datum governing means having a datum-setting member; which system comprises an operator-controlled energy-transmitting member; an energy accumulator to which energy is transmitted by said energy-transmitting member; an energy-receiving member movable to adjust said datum-setting member, and to which energy is transmitted from said accumulator; speed-control means to control the rate of movement of said energy-receiving member; and pressure-sensitive means subjected to ambient pressure and connected to adjust said speed-control means.

12. A control-system for an airscrew pitch-controlling mechanism of the type including a variable datum governor having a datum-setting member; which system comprises an operator's lever; a dash-pot having two dash-pot members and a fluid by-pass; a follow-up system having a control member and follow-up means of which said operator's lever is the control member and said follow-up means includes one of said two dash-pot members connected to adjust said datum-setting member; a variable-area restriction in said fluid by-pass; and adjusting means to adjust the area of said restriction including pressure-sensitive means subjected to ambient pressure.

13. A control-system according to claim 12 wherein said adjusting means comprises a needle valve in said by-pass and a barometric capsule connected to move said needle valve.

14. A variable-pitch airscrew, pitch-controlling mechanism for said airscrew, and a control system for said pitch-controlling mechanism of the type including a variable datum governing means having a datum-setting member; which system comprises a variable speed motor; a connection between said motor and said datum-setting member whereby when said motor operates, said datum-setting member moves at a speed dependent on the speed of said motor and of the airscrew; an operator-controlled member operative to initiate movement of said motor and to determine the amount of such movement; speed control means to determine the speed of operation of said motor; and pressure-sensitive means subjected to ambient pressure and operatively connected to adjust said speed-control means.

15. A control-system for an airscrew pitch-controlling mechanism of the type including a variable datum governing means having a datum-setting member; which system comprises a variable speed motor; an operator-controlled member operative to initiate movement of said motor and to determine the amount of such movement; speed-control means to determine the speed of operation of said motor; pressure-sensitive means subjected to ambient pressure and operatively connected to adjust said speed-control means; a cam carried for movement with said datum setting member; a cam follower for said cam; and a linkage connected to said cam follower and to said motor, and operative to control the movement of said datum-setting member so that when said motor operates, said datum-setting member moves at a speed dependent on its own position and on the speed of operation of said motor.

16. A control-system for an airscrew pitch-controlling mechanism of the type including a variable datum governing means having a datum-setting member; which system comprises a resilient loading device; a dash-pot having a piston in a cylinder constituting its two relatively movable members, and a fluid by-pass from one end of said cylinder to the other; a restriction in said by-pass; adjusting means to vary the area of said restriction; pressure sensitive means sensitive to ambient pressure and coupled to move said adjusting means; a lever having a first pivot connection with said resilient loading device, and a second pivot connection with one of said two relatively movable members spaced from said first pivot connection, and a point spaced from said first and second pivot connections the position of which point is operator controlled; a motor to move said datum-setting member; a cam carried for movement with said datum-setting member; a cam follower co-operating with said cam; a floating lever of which one end is connected to move with said one of said two relatively movable members, and of which the other end is connected to move with said cam follower; and a power control member controlling the supply of power to said motor and coupled to move with a location on said floating lever intermediate its ends, whereby, when said point on the first mentioned lever is moved, said datum-setting member is caused to move at a speed dependent on the ambient pressure and on its own position.

DONALD LOUIS MORDELL.
JOHN BERTRAM HOLLIDAY.

REFERENCES CITED

The following references are of record in the file of this patent:

UNITED STATES PATENTS

| Number | Name | Date |
|---|---|---|
| 2,115,485 | Dodson | Apr. 26, 1938 |
| 2,217,364 | Halford et al. | Oct. 8, 1940 |
| 2,372,989 | Udale | Apr. 3, 1945 |
| 2,384,353 | Stieglitz | Sept. 4, 1945 |
| 2,396,618 | Stieglitz et al. | Mar. 12, 1946 |
| 2,457,595 | Orr | Dec. 28, 1948 |

OTHER REFERENCES

Ser. No. 303,551, Gosslau (A. P. C.), published May 18, 1943.